United States Patent
Lee et al.

(10) Patent No.: US 8,477,082 B2
(45) Date of Patent: Jul. 2, 2013

(54) SYSTEM AND METHOD FOR IMPLEMENTING A REMOTE DISPLAY USING A VIRTUALIZATION TECHNIQUE

(75) Inventors: Kwang Wee Lee, Singapore (SG); Leandro Quitalig Galvez, Singapore (SG)

(73) Assignee: Cassis International Pte Ltd., Singapore (SG)

(*) Notice: Subject to any disclaimer, the term of this patent is extended or adjusted under 35 U.S.C. 154(b) by 1078 days.

(21) Appl. No.: 12/386,211

(22) Filed: Apr. 14, 2009

(65) Prior Publication Data
US 2010/0194667 A1 Aug. 5, 2010

Related U.S. Application Data

(60) Provisional application No. 61/206,454, filed on Jan. 30, 2009, provisional application No. 61/206,427, filed on Jan. 30, 2009, provisional application No. 61/206,797, filed on Feb. 4, 2009, provisional application No. 61/206,453, filed on Jan. 30, 2009.

(51) Int. Cl.
*G09G 5/00* (2006.01)

(52) U.S. Cl.
USPC .......................................... 345/2.1; 711/154

(58) Field of Classification Search
USPC ............ 345/2.1; 455/558, 419, 420; 711/154; 370/329; 710/313
See application file for complete search history.

(56) References Cited

U.S. PATENT DOCUMENTS

| | | | |
|---|---|---|---|
| 6,308,062 B1 * | 10/2001 | Chien et al. | 455/420 |
| 6,405,278 B1 | 6/2002 | Liepe | |
| 6,799,155 B1 | 9/2004 | Lindemann et al. | |
| 6,957,179 B2 | 10/2005 | Debling | |
| 7,031,903 B2 | 4/2006 | Debling | |

(Continued)

FOREIGN PATENT DOCUMENTS

| | | |
|---|---|---|
| CN | 1 561 124 | 1/2005 |
| CN | 101132571 | 2/2008 |

(Continued)

OTHER PUBLICATIONS

Aug. 11, 2011 PCT International Premliminary Report on Patentability with Written Opinion for PCT/IB2010/000150.

(Continued)

*Primary Examiner* — Quan-Zhen Wang
*Assistant Examiner* — Yuk Chow
(74) *Attorney, Agent, or Firm* — James P. Klaiber; Pryor Cashman LLP

(57) ABSTRACT

The present disclosure relates to a system and method for operating the display hardware of a wireless device from a media device. In one embodiment, the system may comprise a wireless device that includes a processor, a memory, display hardware, and a slave node adapted to communicate with the display hardware; and a removable media device that includes a memory, a processor, and a master node adapted to communicate with the slave node of the wireless device. In another embodiment, the method may comprise emulating a hardware interface on a removable media device; mapping display hardware of a wireless device to the interface; mapping a processor of the media device to the display hardware; wrapping and sending display hardware commands from a master node of the media device to a slave node of the wireless device; and executing the commands on the display device.

141 Claims, 7 Drawing Sheets

U.S. PATENT DOCUMENTS

| | | | |
|---|---|---|---|
| 2002/0049803 | A1 | 4/2002 | Bandhole et al. |
| 2002/0059542 | A1 | 5/2002 | Debling |
| 2002/0174337 | A1 | 11/2002 | Aihara |
| 2003/0043771 | A1 | 3/2003 | Mizutani et al. |
| 2005/0165997 | A1* | 7/2005 | Sakaki et al. ............... 710/313 |
| 2006/0190238 | A1 | 8/2006 | Autor et al. |
| 2006/0271747 | A1* | 11/2006 | Geiger et al. ............... 711/154 |
| 2007/0043550 | A1 | 2/2007 | Tzruya |
| 2007/0174033 | A1 | 7/2007 | Huang et al. |
| 2007/0178891 | A1* | 8/2007 | Louch et al. ............... 455/420 |
| 2008/0146178 | A1 | 6/2008 | Lu et al. |
| 2008/0243465 | A1 | 10/2008 | Bohizic |
| 2008/0320181 | A1 | 12/2008 | Lauterbach et al. |
| 2010/0194667 | A1 | 8/2010 | Lee et al. |
| 2010/0197289 | A1 | 8/2010 | Lee et al. |
| 2010/0197347 | A1 | 8/2010 | Lee |
| 2010/0198994 | A1 | 8/2010 | Lee |
| 2010/0199008 | A1 | 8/2010 | Lee et al. |
| 2010/0278122 | A1* | 11/2010 | Singh et al. ............... 370/329 |

FOREIGN PATENT DOCUMENTS

| | | |
|---|---|---|
| DE | 199 35 888 | 2/2000 |
| DE | 20 2004 020 819 | 5/2006 |
| EP | 0 994 614 | 4/2000 |
| EP | 1 450 516 | 8/2004 |
| EP | 1 460 820 | 9/2004 |
| FR | 2 854 261 | 10/2004 |
| GB | 2 317 246 | 3/1998 |
| GB | 2 450 570 | 12/2008 |
| JP | 2007251630 | 9/2007 |
| WO | WO 2008/011727 | 1/2008 |
| WO | WO 2010/086711 | 8/2010 |
| WO | WO 2010/086712 | 8/2010 |
| WO | WO 2010/086714 | 8/2010 |
| WO | WO 2010/086731 | 8/2010 |

OTHER PUBLICATIONS

Aug. 11, 2011 PCT International Premliminary Report on Patentability with Written Opinion for PCT/IB2010/000177.
Aug. 11, 2011 PCT International Premliminary Report on Patentability with Written Opinion for PCT/IB2010/000151.
Aug. 11, 2011 PCT International Premliminary Report on Patentability with Written Opinion for PCT/IB2010/000153.
Oct. 27, 2011 PCT International Premliminary Report on Patentability with Written Opinion for PCT/IB2010/000684.
U.S. Appl. No. 12/386,212, filed Apr. 14, 2009, Lee.
U.S. Appl. No. 12/386,208, filed Apr. 14, 2009, Lee et al.
U.S. Appl. No. 12/836,213, filed Apr. 14, 2009, Lee.
U.S. Appl. No. 12/386,210, filed Apr. 14, 2009, Lee et al.
U.S. Appl. No. 61/206,454, Lee, et al.
U.S. Appl. No. 12/386,211, filed Aug. 5, 2010, Lee, et al.
U.S. Appl. No. 51/206,453, Lee.
U.S. Appl. No. 12/386,212, filed Aug. 5, 2010, Lee.
U.S. Appl. No. 61/206,427, Lee, et al.
U.S. Appl. No. 12/386,208, filed Aug. 5, 2010, Lee, et al.
U.S. Appl. No. 61/206,797, Lee.
U.S. Appl. No. 12/386,213, filed Aug. 5, 2010, Lee.
U.S. Appl. No. 12/386,210, filed Aug. 5, 2010, Lee, et al.
U.S. Appl. No. 12/660,723, Lee.
Feb. 16, 2010 Martyn Williams, "SK Telecom Crams Android, Processor Inside a SIM Card", PC World.
Feb. 17, 2010 IDG News Service, "Prototype SIM Card Holds Processor, Memory, Storage and the Android OS", PC World.
Jul. 8, 2010 International Search Report and Written Opinion, for PCT/IB2010/000177.
Jul. 8, 2010 International Search Report and Written Opinion, for PCT/IB2010/000153.
Jul. 8, 2010 International Search Report and Written Opinion, for PCT/IB2010/000684.
Jul. 12, 2010 Invitation to Pay Additional Fees, and Partial International Search, for PCT/IB2010/000150.
Jul. 12, 2010 Invitation to Pay Additional Fees, and Partial International Search, for PCT/IB2010/000151.

* cited by examiner

Prior Art

SYSTEM AND METHOD FOR IMPLEMENTING A REMOTE DISPLAY USING A VIRTUALIZATION TECHNIQUE

CROSS-REFERENCE TO RELATED APPLICATIONS

This application claims priority to U.S. Provisional Patent Applications Ser. Nos. 61/206,454, 61/206,453, and 61/206,427, filed Jan. 30, 2009, and U.S. Provisional Patent Application Ser. No. 61/206,797, filed Feb. 4, 2009, the disclosures of which are incorporated herein by reference.

FIELD OF THE INVENTION

The present invention relates to a system and method for implementing a remote display using a virtualization technique.

BACKGROUND OF THE INVENTION

Manufacturers have designed wireless devices such as cellular telephones and other wireless handsets so that all hardware and software components reside in a single compact device or handset. The wireless devices typically contain embedded operating systems, application software, memory, display controllers, display screens, and other peripheral capabilities including but not limited to GSM, GPRS, CDMA, Bluetooth, audio codec, WiFi, keypads, joysticks, and push buttons.

BRIEF SUMMARY OF THE INVENTION

Although housing software and hardware in a single device may be desirable in some situations, a user may prefer a removable media device that he or she may remotely connect to the display hardware of a compatible wireless device. Accordingly, it may be desirable to have a system and method that employs a virtualization technique to allow configuration and utilization of the display hardware of the wireless device through the removable media device. Such a system and method would allow the user to transmit data for display on the wireless device and control the display settings of the wireless device remotely from the removable media device.

Embodiments of the present invention include a system and method for a Virtual Display Device that employs a virtualization technique to allow configuration and utilization of the display hardware of a wireless device through a removable media device. In one embodiment, the system may comprise a wireless device that includes a processor, a memory, display hardware, and a slave node adapted to communicate with the display hardware; and a removable media device that includes a memory, a processor, and a master node adapted to communicate with the slave node of the wireless device.

In another embodiment of the present invention, the method may comprise emulating a hardware interface on a removable media device, mapping display hardware of a wireless device to the interface, mapping a processor of the media device to the display hardware, wrapping and sending display hardware commands from a master node of the media device to a slave node of the wireless device, and executing the commands on the display device.

BRIEF DESCRIPTION OF THE DRAWINGS

Certain features and aspects of embodiments of the present invention are explained in the following description based on the accompanying drawings, wherein.

DETAILED DESCRIPTION

Figure 1:
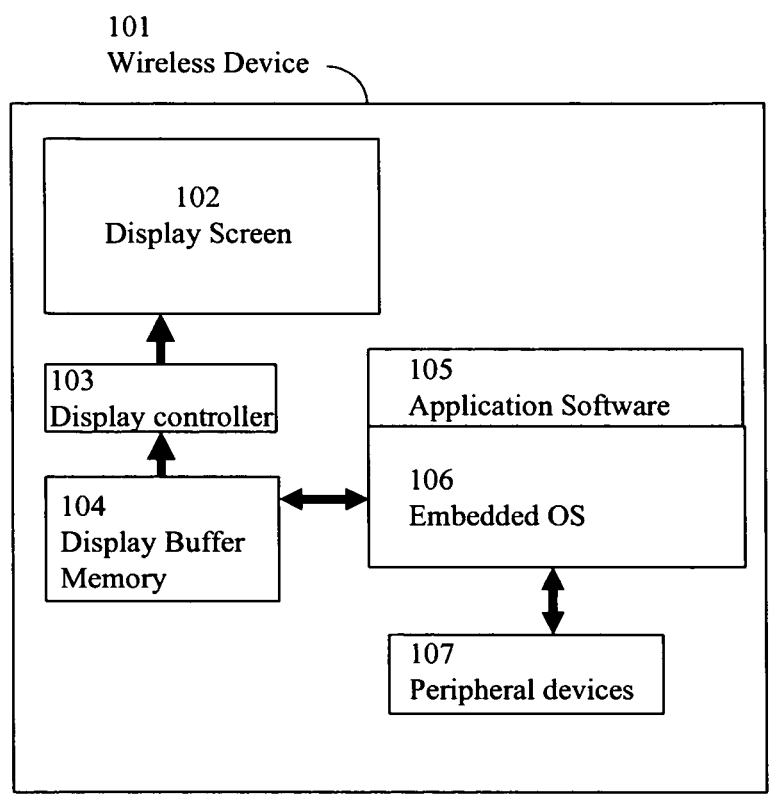
FIG. 1 illustrates an architecture for a wireless device with a processor co-located with the interface hardware.

FIG. 1 illustrates the software and hardware components of a typical wireless device such as a cellular telephone. As shown in FIG. 1, a typical wireless device 101 includes an embedded operating system (OS) 106, application software 105, display buffer memory 104, display controller 103, display screen 102 (e.g., an OLED or LCD display screen), and other peripheral devices 107 (e.g., a GPS, GSM radio, CDMA radio, keyboard, or camera). The OS 106 of a typical wireless device writes data to the display buffer memory 104 and the display controller 103 subsequently displays the data on the display screen 102.

The present invention relates to a Virtual Display Device (VDD) for remotely controlling the display hardware of a wireless device using a removable media device. In one aspect, the VDD may enable display settings and display data to be delivered to the wireless device and controlled remotely from the removable media device. The VDD may allow users to remotely interface with, control, and execute software applications on the display device. The wireless device may communicate with the removable media using a communication link, understand the VDD protocol, process control signals using the protocol, and process and display the display data sent over the protocol.

As described in further detail below with reference to the Figures, the VDD system may be comprised of a VDD protocol that handles the exchange of data and control signals and a VDD core that acts as the core engine for the system where data and control signals are processed. In one aspect, the VDD protocol may be divided into two parts: a master node residing on the removable media device, being the source of display data, and a slave node residing on the wireless device, where display data is processed so that it may subsequently be displayed on a display screen. The VDD slave node may be an ASIC or daemon program running on a basic or baseband processor of the wireless device. The VDD master node and VDD core may be ASIC or daemon programs implemented in the application layer or in the OS kernel of the removable media device.

VDD Architecture

Figure 2:
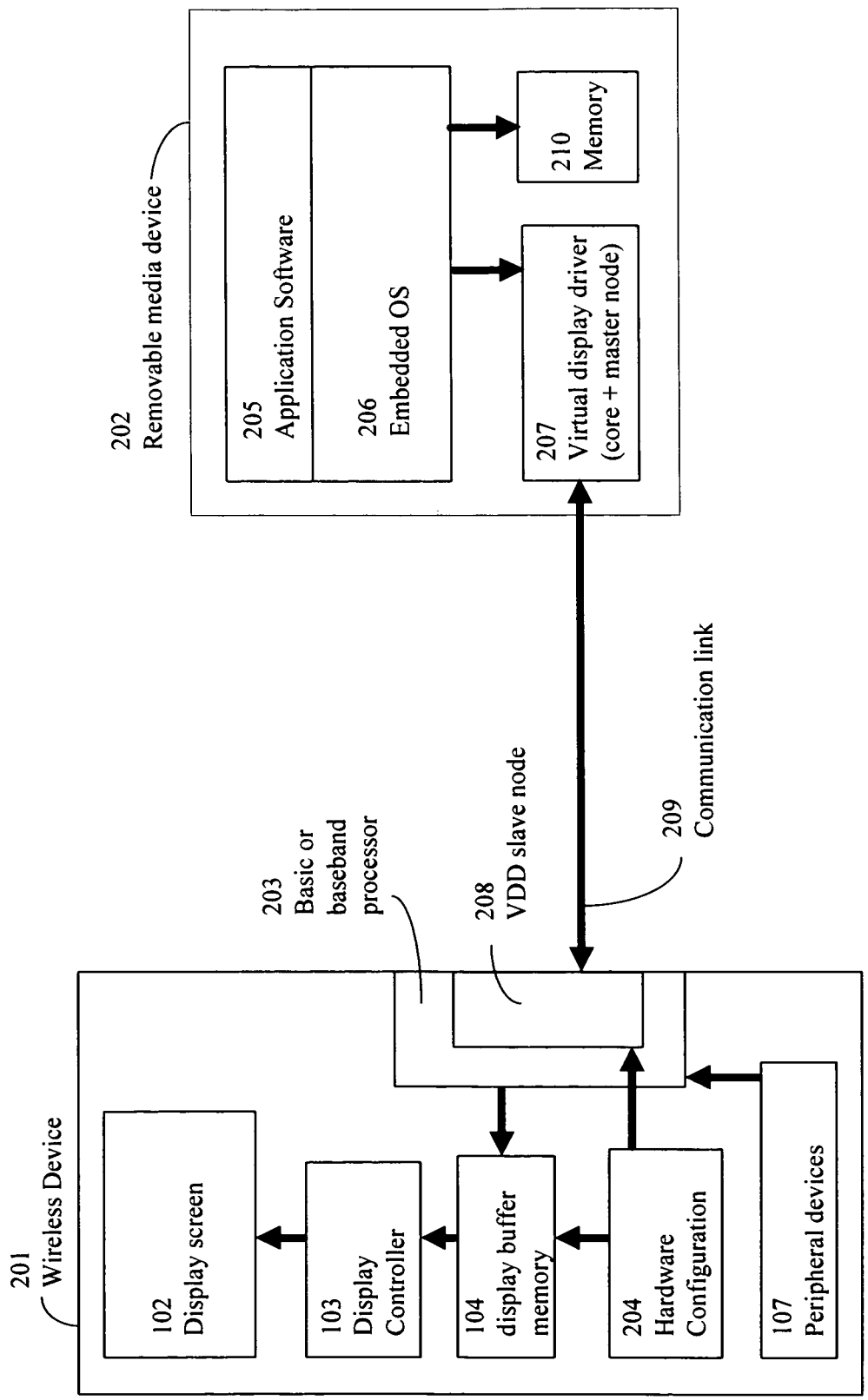
FIG. 2 illustrates a block diagram of the architecture of a Virtual Display Device according to one aspect of the present invention.

In one aspect of the present invention shown in FIG. 2, the system and method may comprise a wireless device 201 and a removable media device 202. The wireless device 201 may comprise a main processor (basic or baseband) 203, a VDD slave node 208, a hardware configuration module 204, a display buffer memory 104, a display controller 103, and a display screen 102. The wireless device may also include peripheral devices 107 such as a display driver, wireless radio system, user input device, GSM radio, GPRS radio, CDMA radio, Bluetooth radio, audio codec, WiFi, keypad, camera, or one or more push buttons.

The removable media device 202 may include an embedded OS 206, a VDD display driver 207 (including a VDD core and VDD master node), application software 205, and memory 210 (including but not limited to RAM, ROM, and Flash). In one aspect, the removable media 202 may refer to a removable media card in a form factor including but not limited to USB dongle, SIM, SAM, SD, or micro SD. In the embodiment shown in FIG. 2, the removable media device and wireless device are connected by and may communicate through a communication link 209. In one aspect, communication link 209 may be a bus, such as USB, high-speed digital data bus, or other removable card format bus. In other aspects, communication link 209 may be a wireless connection.

A user may manipulate the display settings (i.e., frame rate, resolution, color, power, and other properties that affect the configuration of the display) of the wireless device 201 using display setting information accessed from the hardware configuration module 204. The VDD master node of the VDD display driver 207 may access the hardware configuration module 204 in the wireless device 201 via the VDD slave node 208. As described in greater detail below, the master node of the VDD display driver 207 may query the VDD slave node 208 during power-up to obtain the hardware configuration and display settings and subsequently configure the VDD core to support the display hardware configurations of wireless device 201.

After receiving the hardware configuration information, the VDD master node may inform the VDD core of the VDD driver 207 and configure the removable media device 202 based on the hardware configuration information. This technique may enable the applications of application software 205 in the removable media device 202 to support any display setting or configuration used by the wireless device 201. For example, the VDD according to the present invention may allow applications in the removable media device 202 that normally work on 320×320 screen resolution to be configured to work on 240×240 resolution without the need to change the application software 205.

In another aspect, a user may transfer a virtual screen or graphics data from the removable media device 202 to the wireless device 201 using the present invention. The VDD may manage the transport of data from the memory 210 of removable media device 202 to the VDD slave node 208 in the wireless device 201 via the communication link 209. The data from the removable media device 202 may be in pixel map format to enable transfer of raw pixel data or video compression. The display controller 103 in the wireless device 201 may retrieve display data from the display buffer memory 104 and subsequently display the data on the display screen 102.

Figure 3:
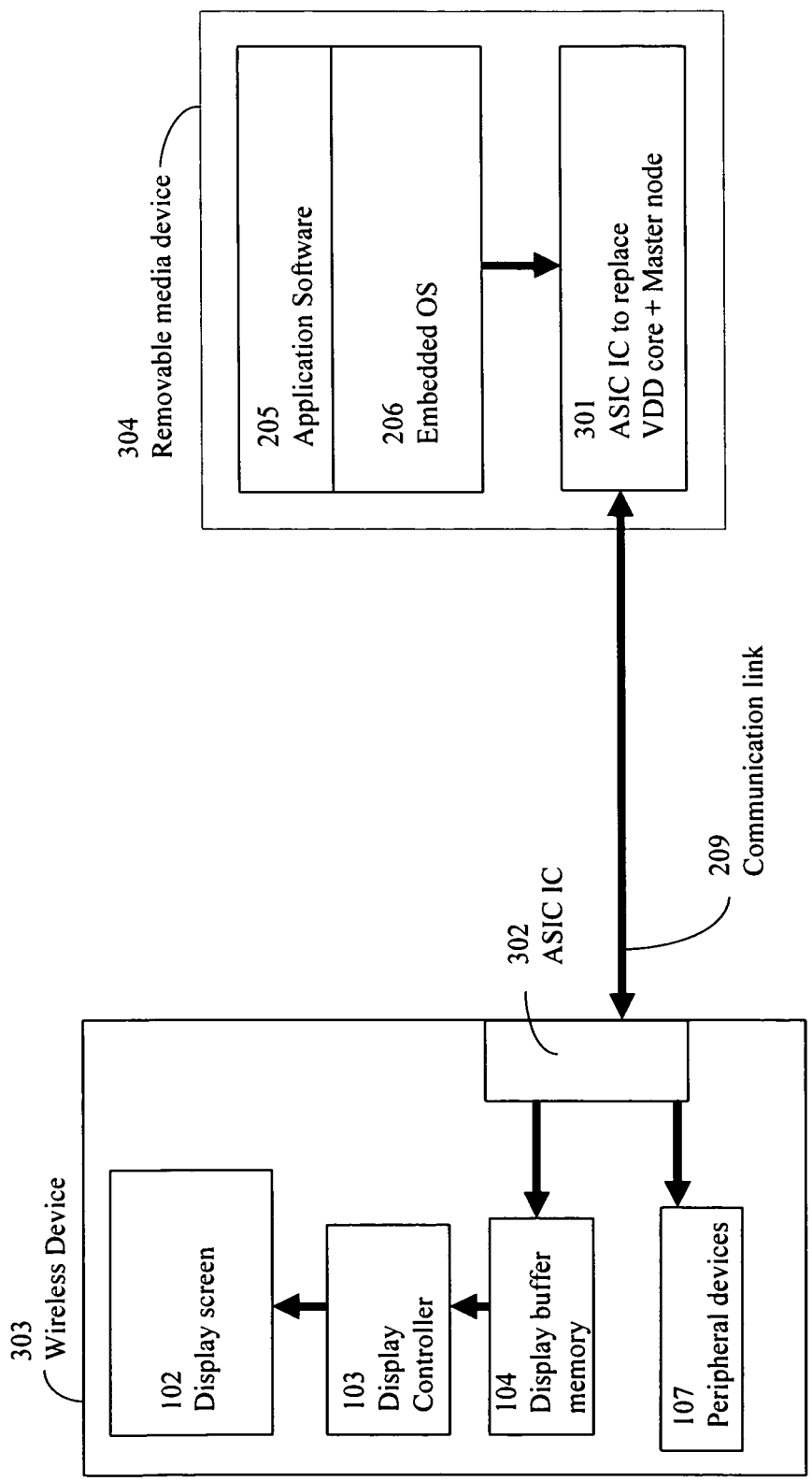
FIG. 3 illustrates a block diagram of the architecture of a Virtual Display Device implemented using ASIC IC hardware according to one aspect of the present invention.

Other aspects of the present invention are shown in the remaining accompanying figures. The system in FIG. 3 uses a full hardware design that may handle the whole wireless device system. That is, instead of using a software application or daemon program to implement the VDD slave node of FIG. 2 for example, this aspect of the present invention may use custom hardware IC such as an ASIC 302 to implement the VDD slave node and ASIC 301 to replace the VDD core and master node. The wireless device 303 and removable media device 304 of this design may handle the VDD protocol and process the protocol using micro codes or pure hardware logic.

Figure 4:
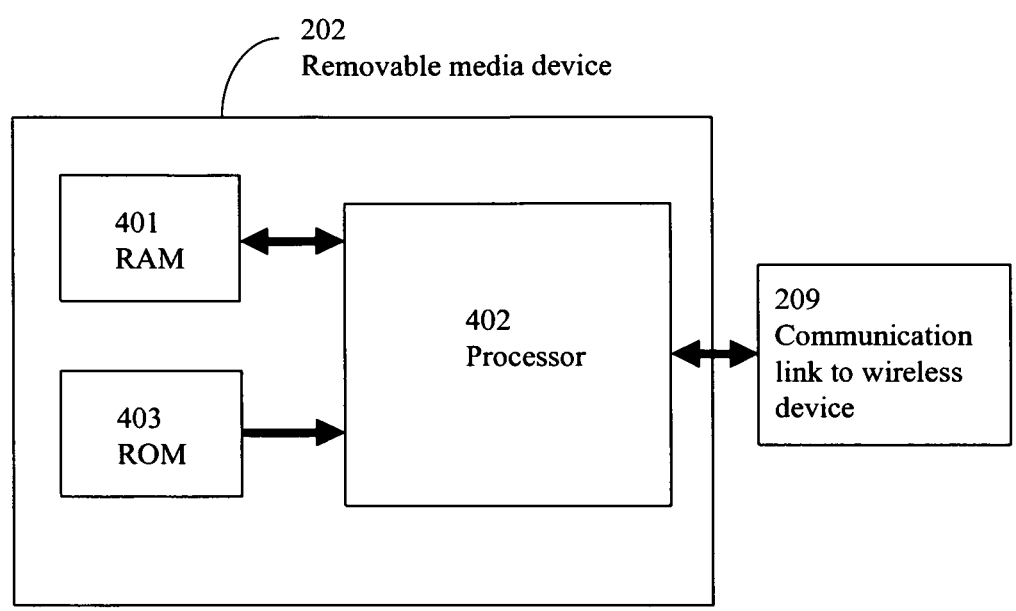
FIG. 4 illustrates a block diagram of the architecture of a removable media device according to one aspect of the present invention.

FIG. 4 illustrates a further embodiment of a removable media device 202 according to the present invention comprised of RAM 401, ROM 403, and a processor 402 that may be coupled to a wireless device shown in the previous Figures using communication link 209. This removable media device 202 may include additional elements of the previous Figures, such as an OS or core logic for controlling the program flow and data flow in the system, a device driver to control the communication interface device that links to the wireless device, and a device driver system for the VDD which emulates the existence of a display device for the removable media device.

Figure 5:
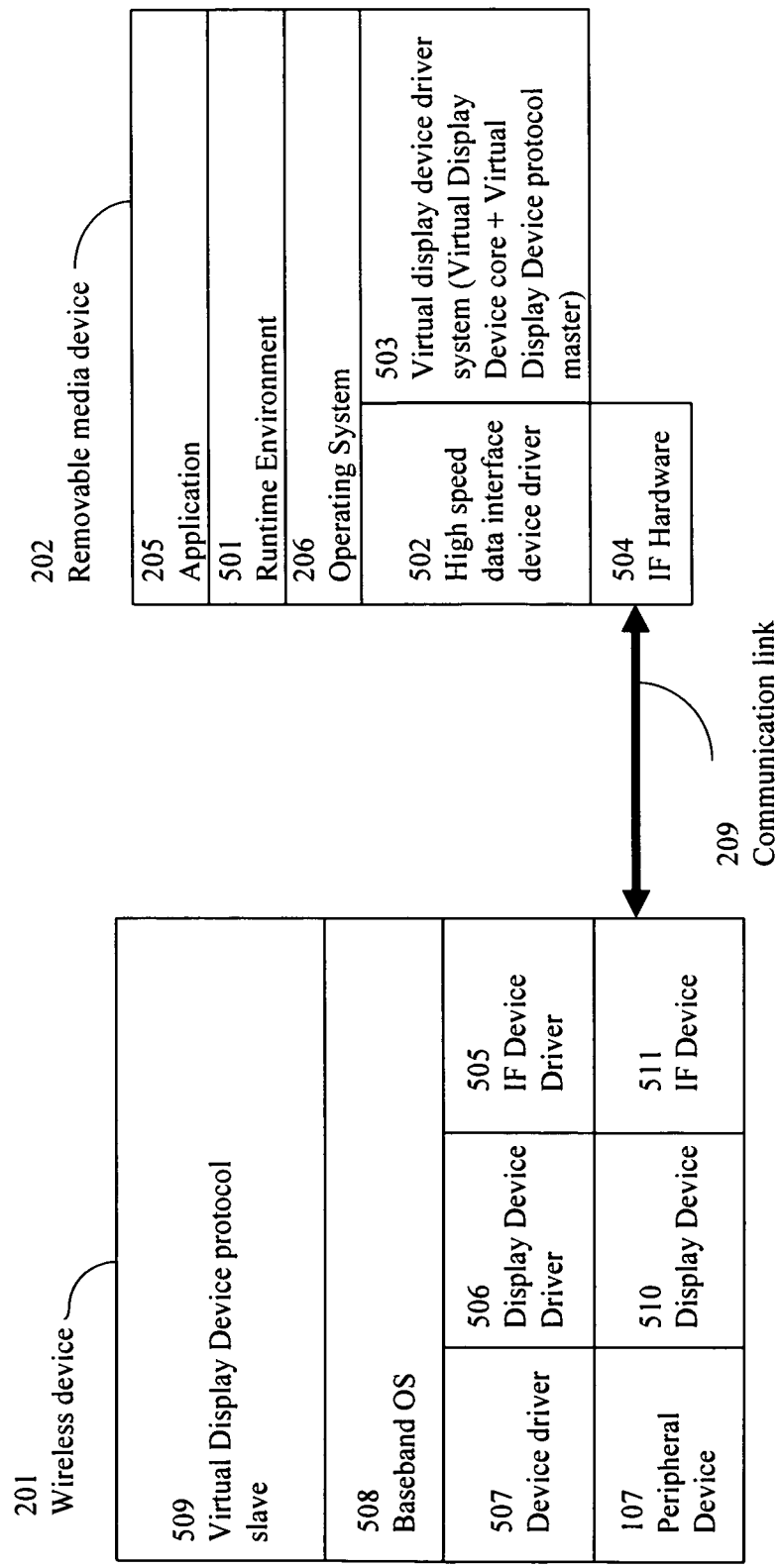
FIG. 5 shows an aspect of the present invention wherein the Virtual Display Device driver system may be implemented using a single module in a device driver layer.

FIG. 5 shows an implementation where the VDD system may be implemented using a single core and master node module in the device driver layer. The removable media device 202 of this implementation includes an application layer 205, a runtime environment layer 501, an OS 206, a VDD driver system 503, an interface (IF) device driver 505 for driving a communication link 209, and an interface hardware 504 that is capable of communicating to the wireless device 201 via communication link 209. In this embodiment, the VDD protocol master node may be located in the same layer as the VDD core of the VDD driver system 503. The wireless device 201 of this implementation includes a VDD protocol slave 509, baseband OS 508, peripheral devices 107, a peripheral device driver 507 for driving the peripheral devices 107, a display device 510, a display driver 506 for driving the display device 510, an interface device 511, and an interface device driver 505 for driving the interface device 511.

Figure 6:
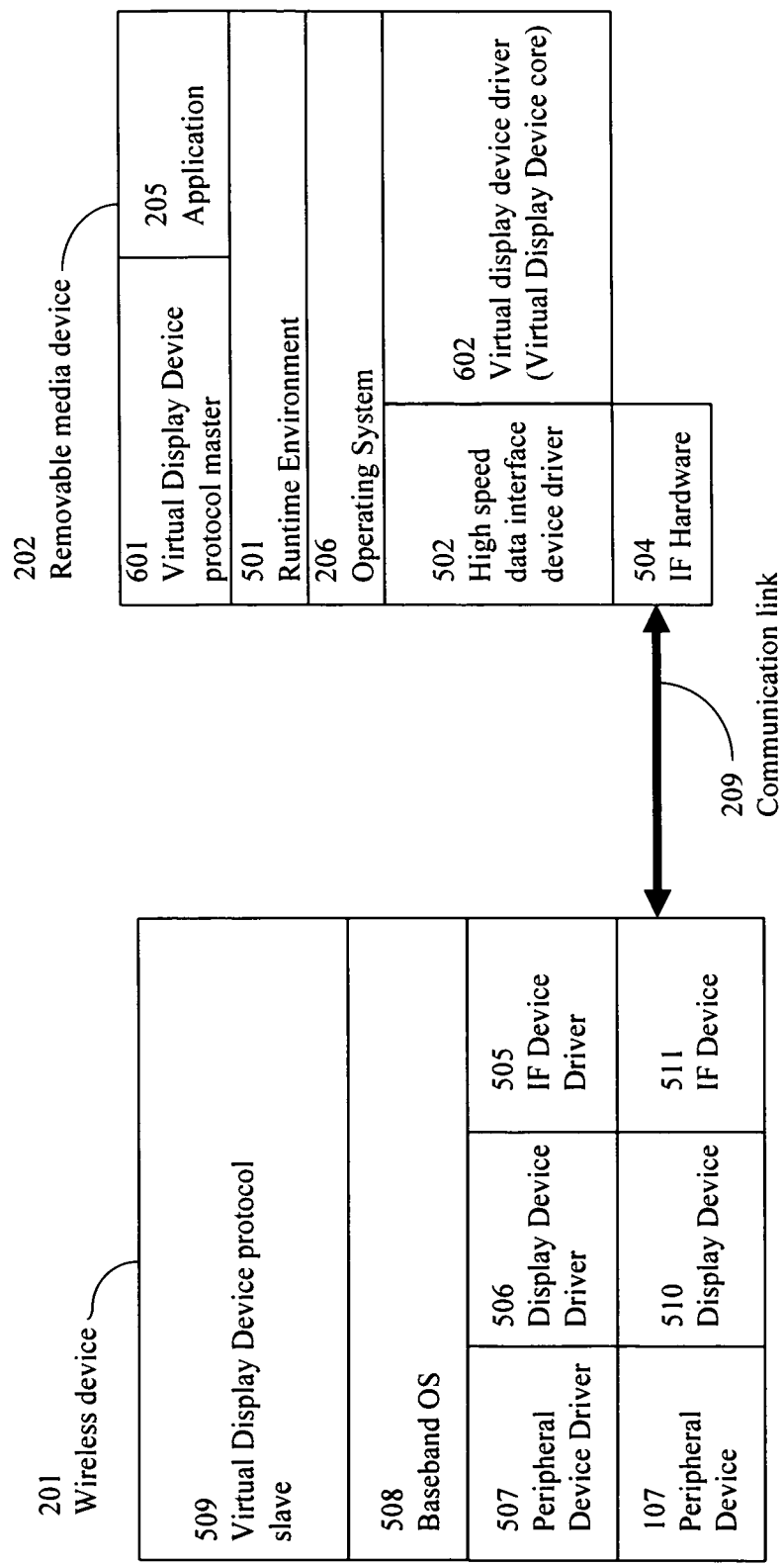
FIG. 6 shows an aspect of the present invention wherein the Virtual Display Device driver system may be implemented using a mixture of application layer and device driver layer modules.

Other embodiments of the present invention are possible. For example, FIG. 6 shows a design in which the VDD protocol master node 601 is located in the same layer as the application software 205, and in a different layer than the VDD core of the VDD driver 602. This latter design may allow easier replacement of the VDD protocol master node by file download without requiring an installation process.

Figure 7:
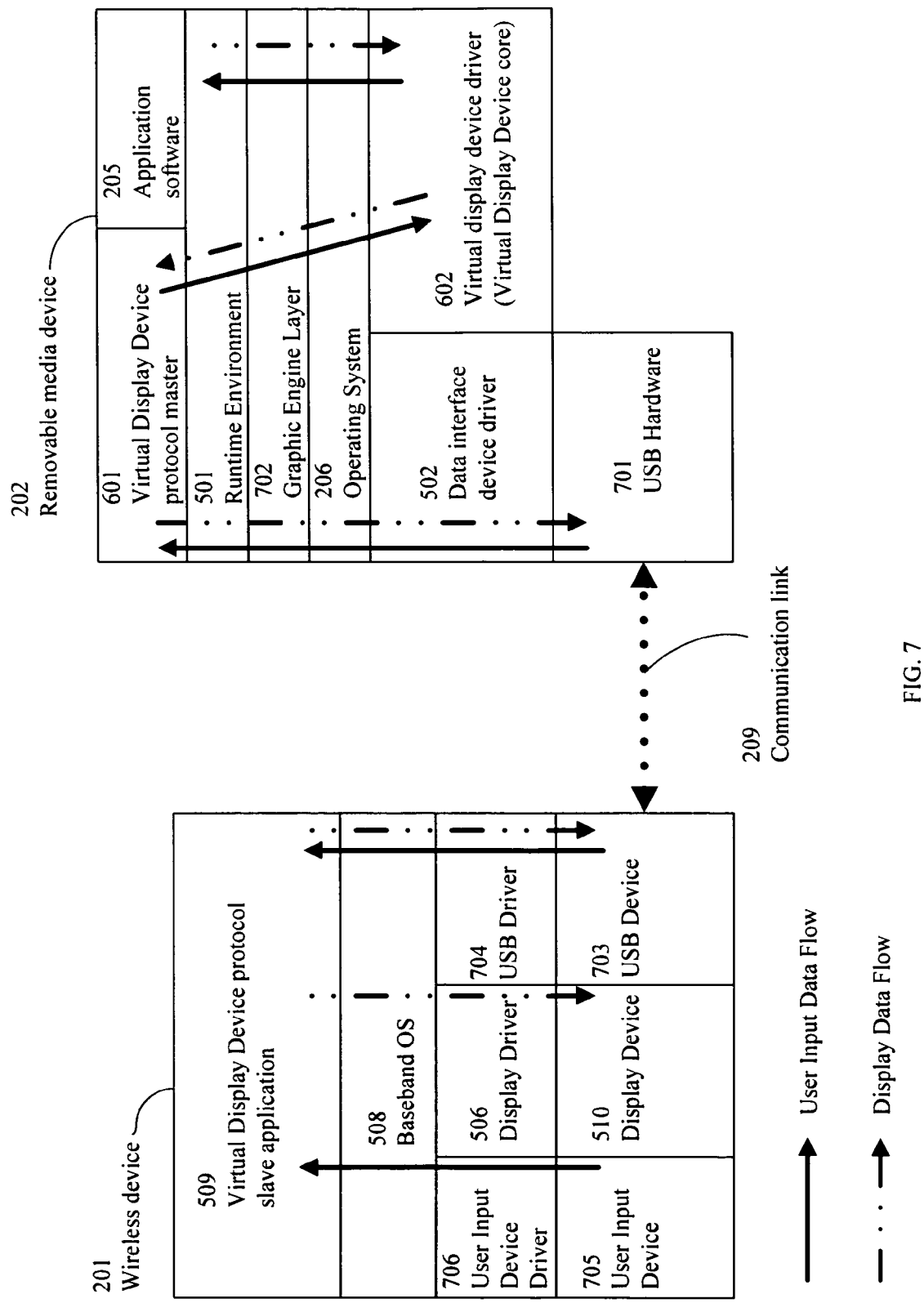
FIG. 7 is a block diagram showing the movement of the user input and display data in a Virtual Display Device according to one aspect of the present invention.

FIG. 7 shows the implementation of a further embodiment of a removable media device and wireless device 202. In this aspect, an OpenMoko Neo Free Runner wireless device may be used, though any hardware configuration is possible. The communication between wireless device 201 and removable media device 202 in this embodiment may be via USB. The wireless device 201 may include a VDD protocol slave application layer 509, a baseband OS 508, a user input device 705 (e.g., push buttons, keypad, WiFi, etc.), a user input driver 706 for driving the user input device 705, a display device 510, a display device driver 506 for driving the display device 510, and a USB device 703 and USB driver 704 for driving the USB device 703.

According to the embodiment of FIG. 7, a Samsung S3C2443 development board may be used as the removable media device 202. This removable media device 202 may have a VDD protocol master layer 601 separate from the VDD core of the VDD driver 602, an application software 205, a graphic engine layer 702, runtime environment layer 501, USB hardware 701, a data interface device driver 502 for driving the USB hardware 701, and an OS layer 206.

As shown in FIG. 7, open-source Linux may be chosen as an OS 206 for the removable media device 202. Other OSs that may be used include Win CE, Symbian, or any other embedded OS. Another aspect may include X-Windows as graphic engine 702, but any other graphic engine may be used instead. Another aspect may include MatchBox as a runtime environment 501, but any other runtime environment, including Android, QT, MontaVista, or Openmoko, may be used.

Detecting Configurable and Non-Configurable Properties

In order to configure display settings of the wireless device using the removable media device, the latter device may first have to determine which properties of the display hardware are configurable and non-configurable. Configurable and non-configurable properties of the display device on the wireless device may be detected and communicated between the wireless device and the removable media device so as to allow for proper initialization of the display device, allow for proper initialization of removable media device applications that will utilize the display device, and avoid unnecessary configuration steps that may bring the system into an unusable state.

The technique used for determining which properties are configurable and non-configurable for at least one embodiment of the present invention may be described using FIG. 7. The first step in detecting configurable properties may occur upon power up and connection of wireless device 201 and removable media device 202. The removable media device 202 may detect the presence of wireless device 201 and inform the VDD core of the VDD driver 602. The VDD core may send a query message requesting whether a display device 510 in the wireless device 201 is present and asking which of its display properties are configurable and non-configurable. The VDD protocol master 601 may send this query message as a control signal to the wireless device 201 over the communication link 209 to the VDD protocol slave 509.

In a subsequent step, the VDD protocol slave 509 on the wireless device 201 may read the registry of the hardware configuration for the required display setting information and return it to the removable media device 202 through the communication link 209. The VDD protocol master 601 may receive the information and return it to the VDD core of the VDD driver 602. The VDD core may record the properties from which the system and the applications can refer to in later configuration stages.

Run-Time Configuration

In one aspect, the VDD system of the present invention may allow for run-time configuration of the display device properties. This may allow for immediate change of the display settings to better suit the operating mode of the system and to better fit a specific application in the most optimal manner. The system may allow for high resolution and refresh rate for viewing videos and still images, and a low resolution and refresh rate for document processing applications to allow for other background applications to utilize the unused processing power.

In a first step according to FIG. 7, the VDD system may check the capabilities of the display device 510 by referring to its recorded configurable and non-configurable properties using the recorded properties from the VDD core of the VDD driver 602. The system may then choose the display properties it desires for optimal performance. During the start-up stage, it is the VDD core of the VDD driver 602 that may choose the display properties as a default start-up display configuration. While at run-time, it is the applications of the application software layer 205 that may choose the required display configurations.

During run-time, the chosen configuration may be passed to the VDD core of the VDD driver 602 from the application of the application software layer 205. The VDD core of the VDD driver 602 may forward the request as a control signal to the VDD protocol master 601, which in turn may send the request to the wireless device 201 over the communication link 209. The VDD protocol slave 509 on the wireless device 201 may process the request and configure the physical display device 510.

The VDD protocol slave 509 on the wireless device 201 may then send the result of the operation and the resulting configuration properties to the wireless media device 202 over the communication link 209. The VDD protocol master 601 may receive the information and return it to the VDD core of the VDD driver 602. The VDD core may subsequently record the current configuration properties from which the system and the applications may refer to later. When the display settings and properties are intended to be non-configurable, the preferred configuration may be hard coded in the record or hard coded in the program code in the VDD core of the VDD driver 602.

Display Data Transfers

As mentioned above, a user may transfer a virtual screen or graphics data from a removable media device to a wireless device using the present invention. The process of transferring display data from the removable media to the display screen may be described in further detail with reference to FIG. 7. As shown in FIG. 7, this process may be accomplished by emulating the existence of a display device and thereby allowing the application software 205 and runtime environment 501 of the removable media device 202 to use the remote display device 506 as if the display device was located in the removable media device.

The display data transfer may be accomplished by the VDD core of the VDD driver 602 and the VDD protocol master node 601 by the VDD core imitating a display controller or other display hardware component, but instead of transmitting display information to a display screen, the VDD protocol master node 601 transmits the display information to the VDD protocol slave node 509. The VDD core of the VDD driver 602 and master protocol node 601 may report the presence of a display to the OS 206 or core logic of the removable media device 202 and offer the interface(s) that the display device 506 would otherwise offer to the wireless device.

The VDD core of the VDD driver 602 that is being reported as a physical display device to the system may receive all the display data from all running applications. The VDD core may implement one or more display data buffers 506 that may collect the graphical user interface data. The VDD core may read the data from the display data buffers either periodically or every time they are modified depending on the application and configuration of the system.

Next, the VDD core of the VDD driver 602 may pass the data to the VDD protocol master node 601, which may subsequently format the data into a data packet and transmit it over the data bus 209. The VDD protocol slave 509 may then receive the display data and feed it to the physical display device to display on the display screen 510 according to the configured properties.

Protocol Format for Packets Between Wireless Device and Removable Media Device

As mentioned, data packets may be transferred to and from the wireless device 201 of FIG. 7 and removable media device 202 while the VDD protocol master 601 and slave 509 are communicating with one another. The following are descriptions of examples of protocols that may be used during this communication process:

Protocol Packet=[protocol Header Guard], protocol Header, Body Content, [protocol Trailer Guard]

Protocol Header=protocol ID, Packet/Body Information

Body Content=(at least 1 of) [Command(s),] [Result(s)] [Data Payload(s)]

Protocol Header Guard=Information on the beginning of the packet to allow separation between packets Protocol ID=Unique sequence of bytes that gives very high probability of identifying real packets together with the protocol Header Guard and the protocol Trailer Guard Packet/Body Information=Gives information on the whole packet and/or body such as, but not limited to, sequence number, size, type, interpretation method Command=Information blocks for sending control signals between VDD protocol master and VDD protocol slave Result=Information blocks for sending events and results between VDD protocol master and VDD protocol slave Data Payload=Information blocks for sending data between VDD protocol master and VDD protocol slave such as, but not limited to, display data and current configuration VDD Protocol Master and Slave Instructions In certain aspects of the present invention, the VDD protocol master 601 of FIG. 7, for example, may communicate with the VDD protocol slave 509 using certain instructions, commands, and result codes. As mentioned above, for instance, the VDD core of the VDD driver 602 may send commands to the VDD slave node 509 requesting the slave node to retrieve display setting information. The VDD slave node 509 may return the result code for the command based on the current display setting information to the VDD core of the VDD driver 602. The following are examples of commands and result codes that may be used in implementing one aspect of the present invention:

DETECT=Command for querying properties of the physical display on the wireless device SET=Command for setting configuration properties of the physical display on the wireless device GET=Command for checking current configuration properties of the physical display on the wireless device DISPLAY=Command for sending display data to the physical display on the wireless device OK/NOK=Result of the previous command The advantages of certain embodiments of the present invention may include:

(1) providing a system and method through which a software application running on a removable media device without any display capabilities may utilize the display from a remote wireless device;

(2) providing a system and method that may allow a user to configure the display settings of a remote wireless device to make the settings compatible with those of a removable media device even if the media device has different hardware configurations;

(3) facilitating fast and efficient development of universal wireless devices that only require implementation of display hardware and a VDD slave node by providing for a system and method for remotely utilizing the graphic display and runtime environment software of a removable media device; and (4) allowing for a universal software application runtime environment in a removable media device that may be reused in any wireless device implementing a compatible VDD slave node.

Although illustrative embodiments have been shown and described herein in detail, it should be noted and will be appreciated by those skilled in the art that there may be numerous variations and other embodiments that may be equivalent to those explicitly shown and described. For example, the scope of the present invention is not necessarily limited in all cases to execution of the aforementioned steps in the order discussed or to the specific elements of the system described. Unless otherwise specifically stated, terms and expressions have been used herein as terms of description, not of limitation. Accordingly, the invention is not to be limited by the specific illustrated and described embodiments (or the terms or expressions used to describe them), but only by the scope of claims appended hereto.

What is claimed is:

1. A system for operating the display hardware of a wireless device from a media device having a virtual display device protocol master node, the system comprising:
   a wireless device, including:
      a processor;
      a memory coupled to said processor;
      display hardware coupled to said memory; and
      a virtual display device protocol slave node adapted to run on said processor and retrieve data from said memory, wherein said slave node is adapted to communicate with said display hardware and the media device;
   wherein said protocol slave node is adapted to receive a formatted command sent from the protocol master;
   said protocol slave node is adapted to receive said command and select from checking registers of said memory for said data and configuring a display configuration; and
   said protocol slave node is adapted to format said data and send said data to said protocol master.

2. The system of claim 1, wherein said slave node is adapted to communicate with the media device by a master node on the media device.

3. The system of claim 1, wherein said slave node is adapted to run a daemon program.

4. The system of claim 1, wherein said slave node is implemented using an ASIC programmed to communicate with an ASIC of the media device.

5. The system of claim 1, wherein said slave node is adapted to communicate with the media device through a communication link.

6. The system of claim 5, wherein said communication link is a data bus.

7. The system of claim 5, wherein said communication link is wireless.

8. The system of claim 1, wherein said slave node is adapted to transmit, to the media device, data corresponding to one or more configuration settings of said display hardware.

9. The system of claim 1, wherein said slave node is adapted to receive data from the media device for configuring one or more settings of said display hardware.

10. The system of claim 1, wherein said slave node is adapted to receive data from the media device for display on said display hardware.

11. A system for operating the display hardware of a wireless device having a virtual display device protocol slave node from a media device, the system comprising:
   a media device, including:
      a first memory;
      a processor coupled to said first memory; and
      a virtual display device protocol master node adapted to run on said processor and retrieve data from said first memory,
   wherein said protocol master node is adapted to communicate with the display hardware of the wireless device;
   wherein said protocol master node is adapted to receive a command, format said command, and send said command to said protocol slave node; and
   said protocol master node is adapted to receive formatted data from said protocol slave node, extract said data, and send said data to a virtual device core to record said data.

12. The system of claim 11, wherein said media device is removably coupled to the wireless device.

13. The system of claim 11, wherein said media device is mechanically connected to the wireless device.

14. The system of claim 11, wherein said media device adheres to a SIM, SAM, SD, micro SD, or USB dongle form factor.

15. The system of claim 11, wherein said media device is a removable media card.

16. The system of claim 11, wherein said first memory is RAM.

17. The system of claim 16, wherein said media device includes a second memory, and wherein said second memory is ROM.

18. The system of claim 11, wherein said master node is adapted to communicate with the display hardware of the wireless device through a communication link.

19. The system of claim 18, wherein said communication link is a data bus.

20. The system of claim 18, wherein said communication link is wireless.

21. The system of claim 11, wherein said processor is adapted to run an embedded operating system.

22. The system of claim 11, wherein said processor is adapted to run a graphics engine for providing a graphical user interface.

23. The system of claim 11, wherein said processor is adapted to run a runtime environment.

24. The system of claim 11, wherein said master node is adapted to communicate with a slave node of the wireless device.

25. The system of claim 11, wherein said master node is adapted to run a daemon program.

26. The system of claim 11, wherein said master node is implemented using an ASIC programmed to communicate with an ASIC of the wireless device.

27. The system of claim 11, wherein said master node is adapted to communicate with the display hardware of the wireless device using an application layer protocol.

28. The system of claim 11, wherein said master node is adapted to communicate with the display hardware of the wireless device using a virtual display device driver layer protocol.

29. The system of claim 11, wherein said media device includes a virtual display device core for emulating the display hardware of the wireless device.

30. The system of claim 11, wherein said master node is adapted to transmit display data for displaying on the display hardware of the wireless device.

31. The system of claim 11, wherein said master node is adapted to transmit data corresponding to one or more display settings for the display hardware of the wireless device to the wireless device.

32. The system of claim 31, wherein said display settings include a setting corresponding to one or more of frame rate, resolution, color, and power.

33. The system of claim 11, wherein said master node is adapted to receive, from the wireless device, data corresponding to one or more configuration settings for the display hardware of the wireless device.

34. The system of claim 33, wherein said configuration settings include a setting corresponding to one or more of frame rate, resolution, color, and power.

35. The system of claim 11, wherein said master node is adapted to communicate with the display hardware of the wireless device by transmitting wrapped packets to the wireless device.

36. The system of claim 35, wherein said wrapped packets include one or more of a protocol header guard, protocol header, body content, and protocol trailer guard.

37. The system of claim 35, wherein said wrapped packets further include body content, said body content including a data payload corresponding to one or more of display data and display configuration.

38. The system of claim 35, wherein said wrapped packets further include a protocol header, said protocol header including body information that identifies one or more of protocol sequence number, size, type, and interpretation method.

39. The system of claim 35, wherein said wrapped packets further include a protocol header, said protocol header including body information that identifies one or more of protocol sequence number, size, type, and interpretation method.

40. A system for operating the display hardware of a wireless device from a media device, the system comprising:
a wireless device, including:
a first processor;
a first memory coupled to said first processor;
display hardware coupled to said memory; and
a virtual display device protocol slave node adapted to run on said first processor and retrieve data from said first memory,
wherein said slave node is adapted to communicate with said display hardware;
and a media device, including:
a second memory;
a second processor coupled to said second memory; and
a virtual display device protocol master node adapted to run on said second processor and retrieve information from said second memory, wherein said master node is adapted to communicate with said slave node of said wireless device, and said slave node is adapted to communicate with said master node of said media device;
wherein said protocol master node is adapted to receive a command, format said command, and send said command through a communication link to said protocol slave node;
wherein said protocol slave node is adapted to receive said command and select from checking registers of said second memory for data or configuring a display configuration;
wherein said protocol slave node is adapted to format said data and send it via said communication link to said protocol master node; and
wherein said protocol master node is adapted to receive said formatted data, extract said data, and send said data to a virtual device core to record said data.

41. The system of claim 40, wherein said master node is adapted to run a daemon program.

42. The system of claim 40, wherein said slave node is adapted to run a daemon program.

43. The system of claim 40, wherein said slave node is adapted to communicate with said master node through a communication link.

44. The system of claim 43, wherein said communication link is a data bus.

45. The system of claim 43, wherein said communication link is wireless.

46. The system of claim 40, wherein said slave node is adapted to transmit, to said master node, data corresponding to one or more configuration settings of said display hardware.

47. The system of claim 40, wherein said master node is adapted to transmit, to said slave node, data corresponding to one or more display settings of said display hardware.

48. The system of claim 47, wherein said display settings correspond to one or more of frame rate, resolution, color, and power.

49. The system of claim 40, wherein said master node is adapted to transmit data to said wireless device for display on said display hardware.

50. The system of claim 40, wherein said first memory is a display buffer memory.

51. The system of claim 40, wherein said wireless device is a cellular telephone.

52. The system of claim 40, wherein said display hardware includes a display screen.

53. The system of claim 52, wherein said display screen is a touch screen adapted to
receive input from a user.

54. The system of claim 40, wherein said display hardware further includes a controller for controlling said display screen.

55. The system of claim 54, wherein said memory is coupled to said display screen by said controller.

56. The system of claim 40, wherein said first processor is a baseband processor.

57. The system of claim 40, wherein said wireless device further includes one or more peripheral devices adapted to run on said first processor.

58. The system of claim 57, wherein at least one of said peripheral devices is radio hardware for receiving and transmitting radio signals.

59. The system of claim 58, wherein said radio hardware is adapted to receive or transmit one or more of CDMA, GPRS, GSM, Bluetooth, and WiFi signals.

60. The system of claim 57, wherein at least one of said peripheral devices is adapted to receive input from a user.

61. The system of claim 60, wherein said input represents one or more commands for controlling said display hardware of the wireless device.

62. The system of claim 37, wherein at least one of said peripheral devices includes a keypad, joystick, push button, or camera.

63. The system of claim 57, wherein at least one of said peripheral devices includes a codec.

64. The system of claim 57, wherein at least one of said peripheral devices includes a wireless network adapter.

65. The system of claim 40, wherein said wireless device further includes a hardware configuration module for storing data corresponding to display settings for said display hardware.

66. The system of claim 40, wherein said media device is removably coupled to the wireless device.

67. The system of claim 40, wherein said media device is mechanically connected to the wireless device.

68. The system of claim 40, wherein said media device adheres to a SIM, SAM, SD, micro SD, or USB dongle form factor.

69. The system of claim 40, wherein said media device is a removable media card.

70. The system of claim 40, wherein said second memory is RAM.

71. The system of claim 40, wherein said media device includes a third memory, and wherein said third memory is ROM.

72. The system of claim 40, wherein said second processor is adapted to run an embedded operating system.

73. The system of claim 40, wherein said second processor is adapted to run a graphics engine for providing a graphical user interface.

74. The system of claim 40, wherein said second processor is adapted to run a runtime environment.

75. The system of claim 40, wherein said master node is implemented using an ASIC programmed to communicate with an ASIC of the wireless device.

76. The system of claim 40, wherein said master node is adapted to communicate with said slave node using an application layer protocol.

77. The system of claim 40, wherein said master node is adapted to communicate with said slave node using a virtual display device driver layer protocol.

78. The system of claim 40, wherein said media device includes a virtual display device core.

79. The system of claim 78, wherein said virtual display device core is programmed to emulate a hardware interface for communicating with a runtime environment.

80. The system of claim 40, wherein said master node is adapted to communicate with said slave node by transmitting wrapped packets to said slave node.

81. The system of claim 80, wherein said wrapped packets include one or more of a protocol header guard, protocol header, body content, and protocol trailer guard.

82. The system of claim 80, wherein said wrapped packets further include body content, said body content including a data payload corresponding to one or more of display data and display configuration.

83. The system of claim 80, wherein said wrapped packets further include a protocol header, said protocol header including body information that identifies one or more of protocol sequence number, size, type, and interpretation method.

84. The system of claim 80, wherein said wrapped packets further include a protocol header, said protocol header including body information that identifies one or more of protocol sequence number, size, type, and interpretation method.

85. A system for operating the display hardware of a wireless device from a media device having a virtual display device protocol master node, the system comprising:
a wireless device, including:
a means for processing;
a means for storing coupled to said means for processing;
a means for displaying data coupled to said storing means; and
a means for unwrapping hardware commands adapted to run on said means for processing and adapted to retrieve data on said means for storing,
wherein said means for unwrapping hardware commands is adapted to receive a formatted command sent from the protocol master;
wherein said means for unwrapping hardware commands is adapted to receive said command and select from checking registers of said memory for said data and configuring a display configuration; and
wherein said means for unwrapping hardware commands is adapted to format said data and send said data to said protocol master.

86. A system for operating the display hardware of a wireless device having a virtual display device protocol slave node from a media device, the system comprising:
a media device, including:
a means for processing;
a means for storing coupled to said means for processing; and
a means for emulating display hardware adapted to run on said means for processing and retrieve data from said means for storing;

wherein said means for emulating display hardware is adapted to receive a command, format said command, and send said command to the protocol slave node; and
wherein said means for emulating display hardware is adapted to receive formatted data from the protocol slave node, extract said data, and send said data to a virtual device core to record the data.

87. The system of claim 86, wherein said media device is removably coupled to the wireless device.

88. The system of claim 86, wherein said media device is mechanically connected to the wireless device.

89. The system of claim 86, wherein said media device adheres to a SIM, SAM, SD, micro SD, or USB dongle form factor.

90. A system for operating the display hardware of a wireless device from a media device, the system comprising:
a wireless device, including:
a first means for processing;
a first means for storing coupled to said first means for processing;
a means for displaying data coupled to said first processing means; and
a means for unwrapping hardware commands adapted to run on said first storing means and said first processing means, wherein said means for unwrapping hardware commands is adapted to communicate with said means for displaying data and to receive, from said media device, said packets by a server in said wireless device;
a media device, including:
a second means for processing;
a second means for storing coupled to said second means for processing; and
a means for emulating said means for displaying data adapted to run on said second storing means and said second processing means, wherein said means for unwrapping hardware commands of the wireless device is adapted to communicate with said means for emulating of the media device, and said means for emulating is adapted to communicate with said means for unwrapping hardware commands in said wireless device, said packets from said media device.

91. The system of claim 90, wherein said media device is removably coupled to said wireless device.

92. The system of claim 90, wherein said media device is mechanically connected to said wireless device.

93. The system of claim 90, wherein said media device adheres to a SIM, SAM, SD, micro SD, or USB dongle form factor.

94. A method for operating the display hardware of a wireless device from a media device comprising:
a. mapping, on the wireless device, a processor of the media device, via a virtual display device protocol slave node;
b. communicating, by said slave node, with a virtual display device protocol master node of the media device;
c. receiving, on the wireless device, wrapped packets containing display hardware commands from said master node of the media device;
d. unwrapping, on the wireless device, said wrapped packets containing display hardware commands;
e. executing, by the wireless device, said display hardware commands; and
f. running a daemon program on said slave node.

95. The method of claim 94, wherein communicating step further includes communicating with said master node through a communication link.

96. The method of claim 95, wherein said communication link is a data bus.

97. The method of claim 95, wherein said communication link is wireless.

98. The method of claim 94, further including the step of transmitting, from the wireless device to the media device, data corresponding to one or more configuration settings of the display hardware.

99. The method of claim 94, wherein said slave node is implemented using an ASIC programmed to communicate with an ASIC of the wireless device.

100. The method of claim 94, wherein the executing step is performed by the display hardware of the wireless device.

101. A method for operating the display hardware of a wireless device from a media device comprising:
a. emulating, on the media device, a hardware interface for communicating with a runtime environment;
b. mapping, by a virtual display device protocol master node on the media device, the display hardware of the wireless device to said emulated hardware interface so the media device operates as if directly connected to the display hardware;
c. wrapping, by said master node on the media device, display hardware commands into packets, said commands comprising one or more of a) querying configurable and non-configurable properties of said display hardware on the wireless device, b) changing configuration settings for said display hardware, c) checking configuration settings of the display hardware, or d) sending display data to the display hardware for display;
d. transmitting, by said master node on the media device, said wrapped packets containing said display hardware commands to the wireless device; and
e. executing commands, by the media device, as if the display hardware of the wireless device is directly connected to the media device;
said emulating said hardware interface further comprising running a daemon program on said master node of said media device.

102. The method of claim 101, wherein the media device is removably coupled to the wireless device.

103. The method of claim 101, wherein the media device is mechanically connected to the wireless device.

104. The method of claim 101, wherein the media device adheres to a SIM, SAM, SD, micro SD, or USB dongle form factor.

105. The method of claim 101, wherein the media device is a removable media card.

106. The method of claim 101, further including the step of communicating with the display hardware of the wireless device through a communication link.

107. The method of claim 106, wherein the communicating step further includes communicating via said master node with a slave node of the wireless device.

108. The method of claim 106, wherein the communication link is a data bus.

109. The method of claim 106, wherein the communication link is wireless.

110. The method of claim 106, wherein the communicating step further includes communicating with the display hardware of the wireless device using an application layer protocol.

111. The method of claim 106, wherein the communicating step further includes communicating with the display hardware of the wireless device using a virtual display device driver layer protocol.

112. The method of claim 101, wherein said master node is implemented by an ASIC programmed to communicate with an ASIC of the wireless device.

113. The system of claim 101, wherein the emulating step is performed by a virtual display device core.

114. The method of claim 101, further including the step of transmitting, from the media device to the wireless device, one or more display settings for the display hardware of the wireless device.

115. The method of claim 114, wherein said display settings include a setting corresponding to one or more of frame rate, resolution, color, and power.

116. The method of claim 101, further including the step of transmitting, from the media device to the wireless device, display data to be displayed on the display hardware.

117. The method of claim 101, wherein the executing step is performed by a processor of the media device.

118. The method of claim 101, wherein said wrapped packets further include one or more of a protocol header guard, protocol header, body content, and protocol trailer guard.

119. The method of claim 101, wherein said wrapped packets further include body content, said body content including a data payload corresponding to one or more of display data and display configuration.

120. The method of claim 101, wherein said wrapped packets further include a protocol header, said protocol header including body information that identifies one or more of protocol sequence number, size, type, and interpretation method.

121. The method of claim 101, wherein said wrapped packets further include a protocol header, said protocol header including body information that identifies one or more of protocol sequence number, size, type, and interpretation method.

122. A method for operating the display hardware of a wireless device from a media device comprising:
  a. emulating, on the media device, a hardware interface for communicating with a runtime environment, said emulating said hardware interface further comprising running a daemon program on said master node of said media device;
  b. mapping, by a virtual display device protocol master node of the media device, the display hardware of the wireless device to said emulated hardware interface so the media device operates as if directly connected to display hardware;
  c. mapping, by a virtual display device protocol slave node of the wireless device, a processor of the media device to the display hardware so the display hardware operates as if directly connected to said processor;
  d. sending, by said master node, wrapped packets containing display hardware commands to said slave node of the wireless device, said commands comprising one or more of a) querying configurable and non-configurable properties of said display hardware on the wireless device, b) changing configuration settings for said display hardware, c) checking configuration settings of the display hardware, or d) sending display data to the display hardware for display;
  e. receiving, by said slave node, said wrapped packets containing display hardware commands from said master node;
  f. unwrapping, on the wireless device, said wrapped packets containing display hardware commands;
  g. executing, by the wireless device, said display hardware commands; and
  h. running a daemon program on said slave node.

123. The method of claim 122, wherein said wrapped packets are sent from said master node to said slave node via a communication link.

124. The method of claim 123, wherein said communication link is a data bus.

125. The method of claim 123, wherein said communication link is wireless.

126. The method of claim 122, wherein said media device is removably coupled to the wireless device.

127. The method of claim 122, wherein said media device is mechanically connected to the wireless device.

128. The method of claim 122, wherein said media device adheres to a SIM, SAM, SD, micro SD, or USB dongle form factor.

129. The method of claim 122, wherein said media device is a removable media card.

130. The method of claim 122, further including the step of communicating between said slave node and said master node using an application layer protocol.

131. The method of claim 122, further including the step of communicating between said slave node and said master node using a virtual display device driver layer protocol.

132. The method of claim 122, further including the step of transmitting, from the wireless device to the media device, data corresponding to one or more configuration settings of the display hardware.

133. The method of claim 122, further including the step of transmitting, from the media device to the wireless device, one or more display settings for the display hardware of the wireless device.

134. The method of claim 133, wherein said display settings include a setting corresponding to one or more of frame rate, resolution, color, and power.

135. The method of claim 122, further including the step of transmitting, from the media device to the wireless device, display data to be displayed on the display hardware.

136. The method of claim 122, wherein the executing step is performed by the display hardware of the wireless device.

137. The method of claim 122, wherein the executing step further includes executing said display hardware commands on the media device as if the display hardware of the wireless device is directly connected to the media device.

138. The method of claim 122, wherein said wrapped packets further include one or more of a protocol header guard, protocol header, body content, and protocol trailer guard.

139. The method of claim 122, wherein said wrapped packets further include body content, said body content including a data payload corresponding to one or more of display data and display configuration.

140. The method of claim 122, wherein said wrapped packets further include a protocol header, said protocol header including body information that identifies one or more of protocol sequence number, size, type, and interpretation method.

141. The method of claim 122, wherein said wrapped packets further include a protocol header, said protocol header including body information that identifies one or more of protocol sequence number, size, type, and interpretation method.

* * * * *